United States Patent [19]

Hanley

[11] Patent Number: 5,114,992
[45] Date of Patent: May 19, 1992

[54] REINFORCED POLYMERS

[75] Inventor: Stephen J. Hanley, Whippany, N.J.

[73] Assignee: Shell Oil Company, Houston, Tex.

[21] Appl. No.: 633,896

[22] Filed: Dec. 26, 1990

[51] Int. Cl.$^5$ ............................................. C08K 9/02
[52] U.S. Cl. ................................... 523/217; 524/612
[58] Field of Search ...................... 523/217; 524/612

[56] References Cited

U.S. PATENT DOCUMENTS

| | | | |
|---|---|---|---|
| 3,694,412 | 9/1972 | Nozaki | 260/63 |
| 3,803,069 | 4/1974 | McWilliams et al. | 523/414 |
| 4,480,071 | 10/1984 | Natarajan et al. | 524/593 |
| 4,843,144 | 6/1989 | Van Broekhoven et al. | 528/392 |
| 4,880,865 | 11/1989 | George | 524/449 |
| 4,880,903 | 11/1989 | Van Broekhoven et al. | 528/392 |
| 4,990,549 | 2/1991 | Delvin et al. | 523/209 |

Primary Examiner—Paul R. Michl
Assistant Examiner—Edward J. Cain
Attorney, Agent, or Firm—James O. Okorafor

[57] ABSTRACT

Improved mechanical properties such as tensile strength are exhibited by glass fiber reinforced linear alternating polymers of carbon monoxide and at least one ethylenically unsaturated hydrocarbon when the glass fibers have a blocked isocyanate sizing material.

8 Claims, No Drawings

REINFORCED POLYMERS

FIELD OF THE INVENTION

This invention relates to reinforced linear alternating polymers of carbon monoxide and at least one ethylenically unsaturated hydrocarbon. More particularly, the invention relates to such linear alternating copolymers reinforced by the presence therein of certain glass fibers.

BACKGROUND OF THE INVENTION

The class of linear alternating polymers of carbon monoxide and at least one ethylenically unsaturated hydrocarbon is known in the art. An early disclosure of the production of such materials is by Nozaki, e.g., U.S. Pat. No. 3,694,412. More recently this class of polymers, now becoming known as polyketones or polyketone polymers, has become of greater interest in part because of the greater availability of the polymers. The more recent processes for the production of such polymers typically involve the use of a catalyst composition formed from a compound of a Group VIII metal selected from palladium, cobalt or nickel, the anion of a strong non-hydrohalogenic acid and a bidentate ligand of phosphorus, arsenic or antimony. These processes are illustrated by van Brockhoven et al, U.S. Pat. Nos. 4,843,144 and 4,880,903.

The resulting linear alternating polymers are relatively high molecular weight materials having established utility as premium thermoplastics. The polyketone polymers are processed by methods conventional for thermoplastics such as extrusion, injection molding and thermoforming into a variety of shaped articles such as containers for food and drink and parts and housings for automotive applications. For some particular applications, however, it has been found desirable to have properties which are somewhat different from those of the polyketone polymer. It would be of advantage to retain the more desirable properties of the polyketone polymers and yet improve other properties, for example, mechanical properties such as tensile strength.

One proposal for obtaining polyketone polymers of greater tensile strength is through the use of an internal reinforcement. A copending U.S. patent application Ser. No. 289,157, filed Dec. 28, 1988, discloses the production of reinforced polyketone polymers wherein the reinforcement is glass fiber. The success of using glass fibers as reinforcement depends in part upon the compatibility of the glass and the polymer. A copending U.S. patent application Ser. No. 579,433, filed Sep. 6, 1990, describes producing reinforced polyketone polymers of improved properties by employing a glass fiber coated with a particular sizing agent incorporating aminosilane and urethane functionalities. It would be of advantage to provide additional means of obtaining glass fiber reinforced polyketone polymers of improved mechanical properties such as tensile strength.

SUMMARY OF THE INVENTION

The present invention provides improved, reinforced linear alternating polymers of carbon monoxide and at least one ethylenically unsaturated hydrocarbon. More particularly, the invention provides such linear alternating polymers reinforced by the presence of glass fibers having a coating of a blocked isocyanate sizing material. The reinforced polymers are characterized by improved mechanical properties such as tensile strength when compared to related reinforced polymers wherein the glass fibers have a more conventional sizing agent.

DESCRIPTION OF THE INVENTION

The reinforced polymers of the invention are linear alternating polymers of carbon monoxide and at least one ethylenically unsaturated hydrocarbon which incorporate as an internal reinforcement glass fibers having a blocked isocyanate sizing material.

The ethylenically unsaturated hydrocarbon which are useful as precursors of the linear alternating polymers have up to 20 carbon atoms inclusive, preferably up to 10 carbon atoms inclusive, and are aliphatic such as ethylene and other α-olefins including propylene, 1-butene, isobutylene, 1-hexane, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-propylstyrene. The preferred polyketone polymers are copolymers of carbon monoxide and ethylene or are terpolymers of carbon monoxide, ethylene and a second ethylenically unsaturated hydrocarbon of at least 3 carbon atoms, particularly an α-olefin such as propylene.

When the preferred terpolymers are employed in the reinforced polymers of the invention, there will be at least 2 units incorporating a moiety of ethylene for each unit incorporating a moiety of the second hydrocarbon. Preferably there will be from about 10 units to about 100 units incorporating a moiety of ethylene for each unit incorporating a moiety of the second hydrocarbon. The polymer chain of the preferred polyketone polymers is therefore represented by the repeating formula:

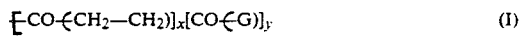
$$[CO-(CH_2-CH_2)]_x[CO-(G)]_y \qquad (I)$$

wherein G is the moiety of an ethylenically unsaturated hydrocarbon of at least 3 carbon atoms polymerized through the ethylenic unsaturation thereof and the ratio of y:x is not more than about 0.5. When the preferred copolymers of carbon monoxide and ethylene are employed in the reinforced polymers of the invention there will be no second hydrocarbon present and y is zero. When y is other than zero, i.e., terpolymers are employed, the —CO—(CH$_2$—CH$_2$)— units and the —CO—(G)— units are formed randomly throughout the polymer chain and the preferred ratios of y:x are from about 0.01 to about 0.1. The end groups or "caps" of the polymer chain will depend upon what materials are present during the production of the polymer and how or whether the polymer has been purified. The end groups do not appear to influence the overall properties of the polymer to any considerable extent so that the polymers are fairly represented by the formula for the polymeric chain as depicted above.

Of particular interest are the polyketone polymers having a number average molecular weight from about 1,000 to about 200,000, especially those polyketone polymers of number average molecular weight from about 20,000 to about 90,000, as determined by gel permeation chromatography. The properties of the polymer are determined in part by the molecular weight, whether the polymer is a copolymer or a terpolymer, and in the case of terpolymers, the nature of and the proportion of the second hydrocarbon present. The polyketone polymers useful in the reinforced polymers of the invention typically have melting points from about 175° C. to about 300° C., often from about 210° C. to about 270° C. The polyketone polymers have a limiting viscosity number, as determined in a standard capillary viscosity measuring device in m-cresol at 60° C., of from about 0.4 dl/g to about 10 dl/g, preferably from about 0.8 dl/g to about 4 dl/g.

The general methods for the recent production of the polyketone polymers are illustrated by the above van Brockhoven et al patents. The carbon monoxide and the hydrocarbon monomers are typically contacted under polymerization conditions in the presence of a catalyst composition formed from a compound of palladium, the anion of a non-hydrohalogenic acid having a pKa (measured in water at 18° C.) below about 6 and preferably below 2, and a bidentate ligand of phosphorus. The scope of the polymerization is extensive but, without wishing to be limited, a preferred palladium compound is a palladium alkanoate such as palladium acetate, the preferred anion is the anion of trifluoroacetic acid or p-toluenesulfonic acid and the preferred bidentate ligand of phosphorus is 1,3-bis(diphenylphosphino)propane or 1,3-bis[di(2-methoxyphenyl)phosphino]propane. The polymerization is conducted in a liquid reaction diluent, preferably an alkanolic diluent and methanol is particularly preferred.

Polymerization conditions for the production of the polyketone polymers include a polymerization temperature from about 20° C. to about 150° C., preferably from about 50° C. to about 135° C. The reaction pressures are from about 1 atmosphere to about 200 atmospheres although pressures from about 10 atmospheres to about 100 atmospheres are more commonly utilized. The monomeric reactants, the catalyst composition and the reaction diluent are contacted in a suitable reaction vessel and such contact is improved by the provision of some means of agitation such as shaking or stirring. Subsequent to reaction the polymerization is terminated as by cooling the reactor and contents and releasing the pressure. The polyketone polymer product is typically obtained as a material substantially insoluble in the reaction diluent and is recovered by conventional methods such as filtration or decantation. The polyketone polymer is used in the reinforced polymers of the invention as recovered or the polymer is purified as by contact with a solvent or an extracting agent which is selective for catalyst residues.

The reinforced polymers of the invention are reinforced by the presence therein of certain glass fibers. The term "glass" is employed in the conventional meaning to indicate that class of complex metal silicates which are commonly referred to as glasses. Although the addition of rare earth metal oxides or transition metal oxides will on occasion produce a glass of rather exotic properties, the glass from which the reinforcing glass fibers are produced is the common glass illustratively containing oxides of aluminum, calcium, boron or magnesium. Fibers of such glass are conventional and are available from a number of U.S. and foreign glass manufacturers. The fibers are useful as reinforcements for polymer materials and are commonly sold for that purpose. However, the physical dimensions of such fibers are of some importance to the successful utilization in a particular application as is the presence or absence of a sizing material or coupling agent on the surface of the glass and, in the case where sizing material is present, the nature of such sizing material.

In the reinforced polymers of the invention, the glass fibers which contribute the more desirable properties to the reinforced polymers of the invention are chopped glass fibers of roughly circular cross-section. The fibers range in diameter from about 5 microns to about 20 microns with diameters from about 8 microns to about 15 microns being preferred. Fibers of greater or lesser diameter are also satisfactory but fibers too small in diameter do not provide the desired strength and fibers too large in diameter contribute too much weight for the strength obtained. Although in some applications longer continuous fibers of glass are satisfactory, it is preferred to use short glass fibers in the reinforced polymers of the invention. Lengths of glass fiber from about 0.1 inch to about 0.5 inch are suitable. While somewhat shorter or somewhat longer lengths are also satisfactory, too long a length of glass fiber detracts from the processability of the polymer-glass mixture while too short a length does not provide the desired strength. It is recognized that the length of the glass fiber in the reinforced polymer will depend to some extent upon the method of mixing the polyketone polymers and the glass fibers as this mixing may mechanically reduce the length of the glass fibers.

The glass fibers used as reinforcements for polymeric materials will customarily be provided by the manufacturer of the fiber with a coating of a sizing material or a coupling agent, which terms are often used interchangeably. The nature of the sizing or coupling agent will influence the interfacial shear strength of the fiber and the polymer matrix, i.e., the degree to which the polymer and the glass fibers will adhere. To contribute strength to the reinforced polymer, the interfacial shear strength will be at least as large as the shear strength of the polymer so that there will be good adhesion between the glass fiber and the polymer. The interfacial shear strength is influenced by the polarity of the polymer so that some sizing agents work better for some polymers than for others. In the case of the polyketone polymers a variety of compatible sizing agents are available, particularly those designed for use with polar polymers. To obtain the desired improvement in mechanical properties and particularly tensile strength, a particular type of sizing is used on the glass fibers of the reinforced polymers of the invention.

The sizing materials are generally characterized by the nature of the size in terms of its functionality rather than the specific structures present which are often proprietary with the glass fiber manufacturer. Such characterization is conventional and well known in the art. The glass fibers used in the reinforced polymers of the invention are those identified as a blocked isocyanate size.

Blocked isocyanates are characterized by two or more isocyanate (—NCO) moieties which have been reacted ("blocked") with an active hydrogen compound. The isocyanates employed are the conventional and well known isocyanates, e.g., those utilized in polyurethane production, such as methylenediisocyanate (MDI), toluenediisocyanate (TDI), 1,4-bis-(isocyanatomethyl)cyclohexane, isopheronediisocyanate and polymeric materials including copolymers of 2-cyanatoethyl methacrylate and styrene. The "blocking" of the isocyanate groups is accomplished by reaction with a variety of active hydrogen compounds including phenols, amines and amides and oximes. Blocking agents employed commercially include caprolactam, phenol and acetone oximes. A discussion of blocked isocyanates is found in Kirk-Othmer, Encyclopedia of Chemical Technology, 3rd Ed., Vol. 23, p. 583. Glass fibers containing such a sizing agent are commercially available. The glass fibers are used in the reinforced polymers in a quantity from about 1% by weight to about 45% by weight based on total reinforced polymer. Quantities of glass fibers from about 10% by weight to about 35% by weight on the same basis are preferred.

The method of producing the reinforced polymers of the invention is not critical so long as an intimate mixture of the polymer and glass is obtained without undue degradation of the components or the resulting mixture. In one modification, the polymer and the glass fibers are dry mixed and converted to an intimate mixture by application of elevated temperature and pressure. In an alternate modification, the components are passed through an extruder to produce the mixture as an extrudate. The components are also mixed in a blender or similar mixing device which operates at elevated temperatures and high shear.

The reinforced polymers of the invention may also include conventional additives such as antioxidants, stabilizers, mold release agents, fire retardant chemicals, processing aids and other materials which are designed to improve the processability of the components or to improve the properties of the reinforced polymer. A particularly useful additive to be employed is an acidic polymer containing moieties of an α-olefin and an α,β-ethylenically unsaturated carboxylic acid, which is optionally partially neutralized with non-alkali metals. Such materials are illustrated by the polymers of ethylene and acrylic acid or methacrylic acid which are marketed by Dow as PRIMACORE ® and by DuPont as NUCREL ®, or by the polymers partially neutralized by zinc ions marketed by DuPont as SURLYN ®.

The reinforced polymers are characterized by increased tensile strength and other mechanical properties. The reinforced polymers are therefore useful in particular applications where strength is desired. Illustrative of such applications are the production of parts and housings for automotive applications and structural parts for use in the construction industry.

The invention is further illustrated by the following Illustrative Embodiments which should not be regarded as limiting.

ILLUSTRATIVE EMBODIMENT I

A series of reinforced polymers was produced by passing a mixture of a linear alternating terpolymer of carbon monoxide, ethylene and propylene and one of a number of commercially available glass fibers through a Haake twin screw extruder. Each sample contained 30% by weight of glass fiber based on total mixture. For purposes of this Illustrative Embodiment, the fibers compared were each 13 microns in diameter. The tensile strength of the reinforced polymer and the functionality of the sizing used on the glass fiber are shown in Table I.

TABLE I

| Fiber | Sizing Type | Tensile Strength, KPSI |
|---|---|---|
| A | Epoxy | 8.5 |
| B | Polyurethane/epoxy | 9.6 |
| C | Polyurethane | 11.0 |
| D | Acrylate/Peroxide | 8.6 |
| E | Blocked Isocyanate | 10.9 |

ILLUSTRATIVE EMBODIMENT II

Two reinforced polymers were made by the procedure of Illustrative Embodiment I containing 15% by weight of glass fiber based on total reinforced polymer. When the glass fibers had a polyurethane size the tensile strength was 10.3 KPSI. When the glass fibers had a blocked isocyanate size the tensile strength was 11.0 KPSI.

ILLUSTRATIVE EMBODIMENT III

A series of reinforced polymers were produced by the procedure of Illustrative Embodiment I which contained several diameters of glass fiber and several sizings and certain of the samples also contained SURLYN ® 9650. The composition of these reinforced polymers is shown in Table II. In all cases, the polyketone polymer was a linear alternating terpolymer of carbon monoxide, ethylene and propylene having a limiting viscosity number, measured in m-cresol at 60° C., of 1.4 dl/g.

TABLE II

| Sample | Fiber Diameter, microns | Sizing Material(s) | % wt Fiber | % wt SURLYN ® | % wt Polymer |
|---|---|---|---|---|---|
| F | 9 | Polyurethane/epoxy | 30 | — | 70 |
| G | 9 | Polyurethane/epoxy | 30 | 1 | 69 |
| H | 9 | Polyurethane/epoxy | 30 | 5 | 65 |
| I | 9 | Blocked Isocyanate | 30 | — | 70 |
| J | 9 | Blocked Isocyanate | 30 | 1 | 69 |
| K | 13 | Blocked Isocyanate | 30 | — | 70 |
| L | 13 | Blocked Isocyanate | 30 | 1 | 69 |

The mechanical properties of reinforced polymers F-L were evaluated by conventional techniques. The results are listed in Table III.

TABLE III

| Sample | Tensile strength at break KPSI | Elongation at break % | Tensile modulus, KKPSI | Flexural Strength at 5% strain KPSI | at break KPSI | Flexural modulus. KKPSI | Izod Impact strength ft-lb/in |
|---|---|---|---|---|---|---|---|
| F | 18.1 | 3 | 1.08 | — | 25.9 | 1.02 | 1.9 |
| G | 19.4 | 3 | 1.10 | — | 28.0 | 1.07 | 2.3 |
| H | 17.3 | 3 | 1.00 | — | 26.0 | 0.935 | 2.2 |

TABLE III-continued

| Sample | Tensile strength at break KPSI | Elongation at break % | Tensile modulus, KKPSI | Flexural Strength at 5% strain KPSI | Flexural Strength at break KPSI | Flexural modulus, KKPSI | Izod Impact strength ft-lb/in |
|---|---|---|---|---|---|---|---|
| I | 19.4 | 3 | 1.10 | — | 29.2 | 0.958 | 2.3 |
| J | 19.3 | 3 | 1.09 | — | 29.5 | 0.972 | 2.5 |
| K | 14.4 | 6 | 0.846 | 24.6 | — | 0.863 | — |
| L | 14.8 | 5 | 0.897 | 24.4 | — | 0.851 | — |

What is claimed is:

1. A composition having improved mechanical properties consisting essentially of a linear alternating polymer of carbon monoxide and at least one ethylenically unsaturated hydrocarbon and glass fiber having a blocked isocyanate sizing material.

2. The reinforced polymer of claim 1 wherein the glass fiber is present in a quantity from about 1% by weight to about 45% by weight based on total reinforced polymer.

3. The reinforced polymer of claim 1 wherein the linear alternating polymer is represented by the repeating formula

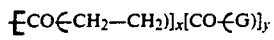

wherein G is the moiety of the second ethylenically unsaturated hydrocarbon of at least 3 carbon atoms polymerized through the ethylenic unsaturation and the ratio of y:x is no more than about 0.5.

4. The reinforced polymer of claim 3 wherein y is zero.

5. A reinforced polymer of claim 3 wherein G is a moiety of propylene and the ratio of y:x is from about 0.01 to about 0.1.

6. The reinforced polymer of claim 5 wherein the blocked isocyanate size is characterized by two or more isocyanate groups which have been reacted with an active hydrogen compound.

7. The reinforced polymer of claim 6 wherein the active hydrogen compound is selected from caprolactam, phenol and acetone oxines.

8. The reinforced polymer of claim 6 wherein the glass fiber is present in a quantity from about 10% by weight to about 35% by weight based on total reinforced polymer.

* * * * *